(12) United States Patent
Willassen (10) Patent No.: US 8,310,569 B2
(45) Date of Patent: Nov. 13, 2012

(54) SUPPRESSION OF ROW-WISE NOISE IN CMOS IMAGE SENSORS

(75) Inventor: Trygve Willassen, Oppegaard (NO)

(73) Assignee: Aptina Imaging Corporation, George Town, Grand Cayman (KY)

( * ) Notice: Subject to any disclaimer, the term of this patent is extended or adjusted under 35 U.S.C. 154(b) by 1124 days.

(21) Appl. No.: 11/795,274

(22) PCT Filed: May 21, 2007

(86) PCT No.: PCT/US2007/069392
§ 371 (c)(1),
(2), (4) Date: Jul. 13, 2007

(87) PCT Pub. No.: WO2008/150283
PCT Pub. Date: Dec. 11, 2008

(65) Prior Publication Data
US 2010/0053379 A1    Mar. 4, 2010

(51) Int. Cl.
H04N 5/217 (2011.01)
H04N 9/64 (2006.01)
H04N 3/14 (2006.01)
H04N 5/335 (2011.01)
H01L 27/00 (2006.01)

(52) U.S. Cl. ........ 348/245; 348/241; 348/243; 348/294; 348/302; 348/308; 250/208.1

(58) Field of Classification Search .................. 348/241, 348/207.99, 222.1, 243–245, 251, 294–324; 250/208.1
See application file for complete search history.

(56) References Cited

U.S. PATENT DOCUMENTS

| 5,113,246 | A  | * | 5/1992  | Ninomiya et al. | 348/234  |
|-----------|----|---|---------|------------------|----------|
| 5,654,755 | A  | * | 8/1997  | Hosier           | 348/245  |
| 6,118,115 | A  | * | 9/2000  | Kozuka et al.    | 250/208.1|
| 6,344,877 | B1 | * | 2/2002  | Gowda et al.     | 348/245  |
| 6,646,681 | B1 |   | 11/2003 | Macy et al.      | 348/241  |

(Continued)

FOREIGN PATENT DOCUMENTS
EP    1668895    6/2006
(Continued)

OTHER PUBLICATIONS

"A CMOS Imager With Column-Level ADC Using Dynamic Column Fixed-Pattern Noise Reduction", Martijin F. Snoeij, Student Member IEEE, Albert J. P. Theuwissen, Fellow, IEEE, Kofi A. A. Makinwa, Senior Member, IEEE and Johan H. Huijsing, Fellow, IEEE; IEEE Journal of Solid-State Circuits, vol. 41, No. 12, Dec. 2006.

(Continued)

Primary Examiner — Jason Chan
Assistant Examiner — Michael Osinski
(74) Attorney, Agent, or Firm — Kramer Levin Naftalis & Frankel LLP (57) ABSTRACT

Embodiments of circuits and methods for suppressing row-wise noise in the analog domain in an image sensing device. In one embodiment, a pixel sampling circuit includes a read-out circuit that is connected to a plurality of pixels to receive analog signals from the pixels. The pixel sampling circuit also includes a noise correction circuit that provides a reference signal to remove at least a portion of the noise in the analog signals received from the pixels before the analog signals are converted into digital signals.

21 Claims, 8 Drawing Sheets

U.S. PATENT DOCUMENTS

| | | | |
|---|---|---|---|
| 6,914,627 B1 | 7/2005 | Dong | 348/248 |
| 7,477,299 B2 * | 1/2009 | Higuchi et al. | 348/241 |
| 8,218,048 B2 * | 7/2012 | Masuyama | 348/302 |
| 2002/0105012 A1 | 8/2002 | Hua | 257/200 |
| 2003/0133627 A1 | 7/2003 | Brehmer et al. | 382/308 |
| 2003/0234344 A1 | 12/2003 | Lai et al. | 250/208.1 |
| 2004/0051797 A1 | 3/2004 | Kelly et al. | 348/244 |
| 2004/0051802 A1 | 3/2004 | Krymski | 348/308 |
| 2004/0189843 A1 | 9/2004 | Holberg et al. | 348/294 |
| 2004/0222351 A1 * | 11/2004 | Rossi | 250/208.1 |
| 2004/0262492 A1 * | 12/2004 | Matsuda et al. | 250/208.1 |
| 2005/0104981 A1 | 5/2005 | Findlater et al. | 348/241 |
| 2005/0243194 A1 * | 11/2005 | Xu | 348/241 |
| 2006/0170794 A1 * | 8/2006 | Higuchi et al. | 348/241 |
| 2006/0175538 A1 | 8/2006 | Kim et al. | 250/208.1 |
| 2006/0192864 A1 | 8/2006 | Mauritzson | 348/241 |
| 2006/0220940 A1 | 10/2006 | Oh | 341/155 |
| 2006/0250513 A1 * | 11/2006 | Yamamoto et al. | 348/294 |
| 2006/0284998 A1 | 12/2006 | Park et al. | 348/308 |
| 2007/0153103 A1 * | 7/2007 | Shibasaki | 348/241 |
| 2008/0012966 A1 * | 1/2008 | Beck et al. | 348/245 |
| 2008/0258047 A1 * | 10/2008 | Sakakibara et al. | 250/214 C |
| 2009/0244338 A1 * | 10/2009 | Kume | 348/294 |
| 2010/0308345 A1 * | 12/2010 | Brown et al. | 257/82 |
| 2011/0205405 A1 * | 8/2011 | Ovsiannikov | 348/245 |

FOREIGN PATENT DOCUMENTS

| | | |
|---|---|---|
| JP | 2000224484 | 8/2000 |
| JP | 2004015712 | 1/2004 |
| JP | 2005101985 | 4/2005 |
| JP | 2005311736 | 11/2005 |
| JP | 2006033815 | 2/2006 |
| TW | 451584 B | 8/2001 |
| TW | 563349 B | 11/2003 |
| WO | WO/9914969 | 3/1999 |

OTHER PUBLICATIONS

"*A CMOS Image Sensor with a Simple Fixed-Pattern-Noise-Reduction Technology and a Hole Accumulation Diode*", Kazuya Yonemoto and Hirofumi Sumi; IEEE Journal of Solid-State Circuits, vol. 35, No. 12, Dec. 2000.

"*A 256×256 CMOS Differential Passive Pixel Imager with FPN Reduction Techniques*", Lliana L. Fujimori, Ching-Chun Wang and Charles G. Sodini, Fellow, IEEE; IEEE Journal of Solid-State Circuits, vol. 35, No. 12, Dec. 2000.

Loose et al. "CMOS Image Sensor with Logarithmic Response and Self Calibrating XED Pattern Noise Correction." Heidelberg University, Sep. 7, 1998.

\* cited by examiner

Embodiments of the present invention relate generally to image sensors, and more particularly, to noise suppression in image sensors.

SUPPRESSION OF ROW-WISE NOISE IN CMOS IMAGE SENSORS

TECHNICAL FIELD

Embodiments of the present invention relate generally to image sensors, and more particularly, to noise suppression in image sensors.

BACKGROUND OF THE INVENTION

Complementary metal-oxide-semiconductor (CMOS) image sensors have in recent years been widely employed in image sensing applications such as digital cameras, video camcorders, scanners and the like. CMOS image sensors sense light by taking advantage of photoelectric effect. Photoelectric effect occurs when photons interact with crystallized silicon to energize and move electrons from the valence band into the conduction band, where the electrons can be harnessed, creating electric current at a voltage related to the bandgap energy. A conventional CMOS image sensor typically contains a focal plane array of light-sensing elements, referred to as picture elements or pixels, and readout circuitry that outputs signals indicative of the light sensed by the pixels. Each light-sensing element includes a photosensor, which may be a photodiode, a photoconductor, a photogate or the like. When a photosensor is exposed to light, it records the intensity or brightness of the light that falls on it by accumulating an electric charge that is proportional to the brightness of the light due to the photoelectric effect. The brightness recorded by the photosensor in the form of accumulated electric charge is then sampled, amplified, converted into and stored as a representative digital signal that can be used to recreate the image on a screen or on a printed paper.

In operation, the photosensor in each pixel of a CMOS image sensor accumulates photo-generated charge in a specified portion of the substrate. The photosensor capacitance is discharged through a constant integration of time at a rate that is approximately proportional to the illumination of the incident light. The charge rate of the photosensor capacitance is used to convert the optical signal to an electrical signal, as is known in the art. A readout circuit for pixel sampling is coupled to the photosensor, and includes at least a source follower transistor and a row select transistor for coupling the source follower transistor to a column output line. Charge that is generated by the photosensor is transferred to a sensing region, typically a floating diffusion node, connected to the gate of the source follower transistor. For each pixel, the CMOS image sensor may also include a device, such as a transistor, for transferring charge from the photosensor to the floating diffusion node, and another device, also typically a transistor, for resetting the storage region to a predetermined charge level prior to charge transfer.

During sampling, values of the pixels are sampled typically a row of pixels at a time, known as row-wise sampling, using either interlaced or progressive scans. However, a consequence of row-wise sampling is that the pixel values from a single row are susceptible to and contain both correlated noise and non-correlated noise. For example, noise on power supply and common bias lines are sources that will result in correlated noise. When the correlated row noise component changes from row to row, an undesirable effect is likely to result in the form of horizontal stripes in the recreated image. Since the human eye is sensitive to structural noise, such as row-wise noise, it is important to minimize such noise in an image sensor.

One approach to reduce row-wise noise is to first estimate the correlated noise component and then subtract it from the active pixels on the same row in the digital domain. The correlated noise can be estimated, for instance, by averaging values from a set of dark reference pixels on the same row. In general, a dark reference pixel is structurally the same as an active pixel and could be, for example, an active pixel with an optical shield (e.g., black color filter array) or an active pixel with the photosensor tied to the power supply. Dark reference pixels are utilized not to sense light but to sense noise that the rows of active pixels are exposed to.

However, such approach will convert non-correlated noise from the dark reference pixels to row-wise noise. This is so because the averaging of values from the dark reference pixels leads to an estimator noise, $\sigma_{PIX}/N^{0.5}$, where $\sigma_{PIX}$ is the standard deviation for the pixel-wise noise (non-correlated) and N is the number of averaged pixel values. As the number of averaged dark reference pixels is increased in order to reduce the estimator noise, the overhead upon processing a signal row is increased accordingly. This will in turn require an increase in the conversion rate for the analog readout channel, including amplifier and analog-to-digital converter, in order to meet a certain frame rate. Nevertheless, that may not be desirable or feasible for reasons such as limited die size and the need to minimize power consumption, just to name a few. There is, therefore, a need to suppress row-wise noise in the analog domain before analog-to-digital conversion in order to minimize overhead in per-row processing of pixel values.

DETAILED DESCRIPTION OF PREFERRED EMBODIMENTS

Certain details are set forth below to provide a sufficient understanding of embodiments of the invention. However, it will be clear to one skilled in the art that embodiments of the invention may be practiced without these particular details.

Moreover, the particular embodiments of the present invention described herein are provided by way of example and should not be used to limit the scope of the invention to these particular embodiments. In other instances, well-known circuits, control signals, and timing protocols have not been shown in detail in order to avoid unnecessarily obscuring the invention.

Figure 1:
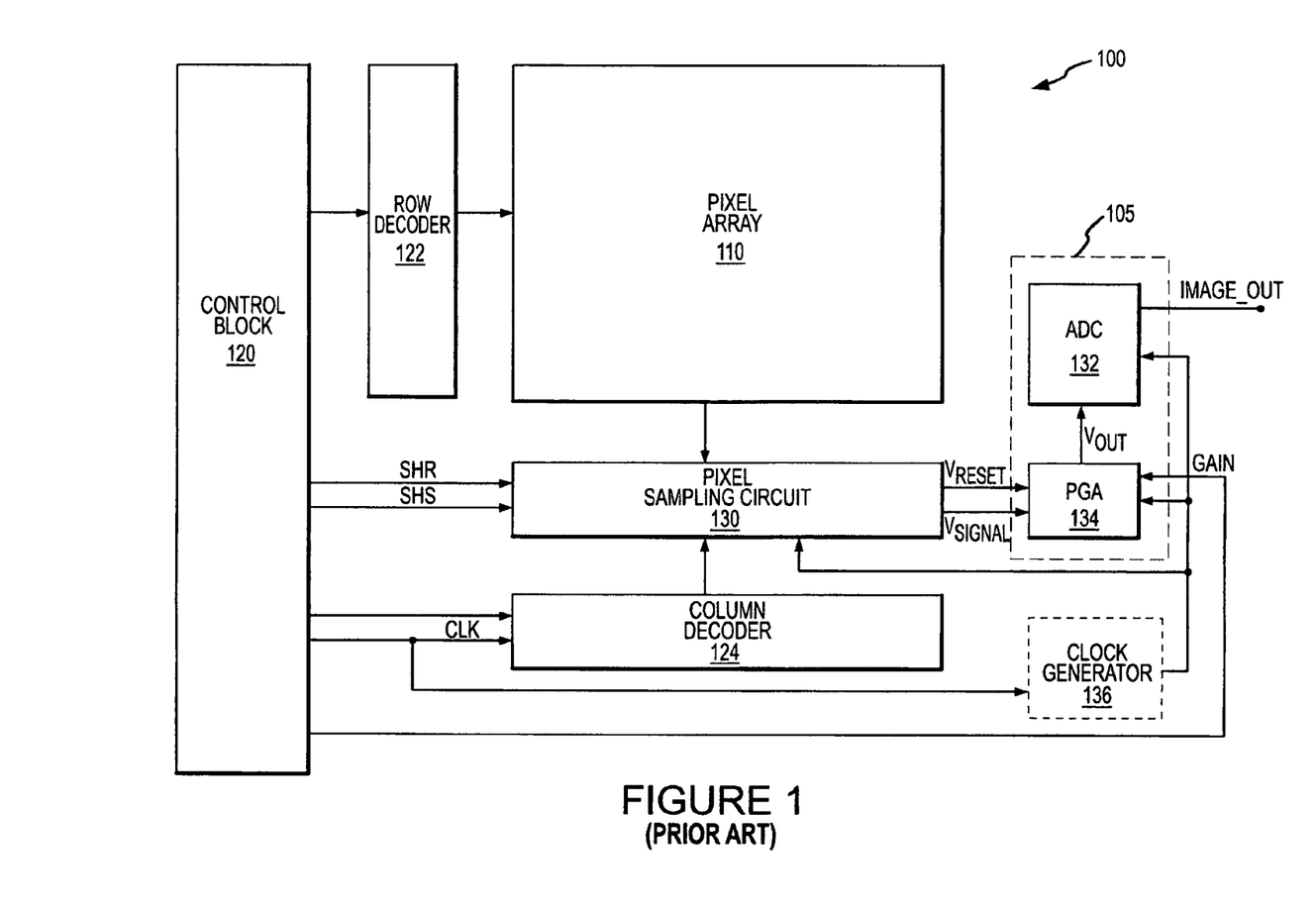
FIG. 1 is a block diagram of a prior art CMOS image sensing device.

FIG. 1 illustrates a block diagram of a prior art CMOS image sensing device 100 having a pixel array 110 of light-sensing photosensors as previously described, or as implemented by other circuitry known in the art. A plurality of pixels arranged in rows and columns are respectively connected to a plurality of row and column lines that are provided for the entire array 110. The pixels of each row in the array 110 are accessed at the same time by a row select line coupled to respective drivers (not shown) in response to a row address received by a row decoder 122. Similarly, the pixel values of pixels of each column in the array 110 are selectively outputted by respective column select lines coupled to drivers (also not shown) in response to a column address being decoded by a column decoder 124. Therefore, each pixel has a row address and a column address.

A control block 120 controls the operation of the CMOS image sensing device 100, which includes controlling the address decoders 122, 124 for selecting the appropriate row and column lines for pixel readout. As known in the art, the pixel output signals typically include a pixel reset signal $V_{reset}$, which is read out of the sensing region or the floating diffusion node after the pixel is reset, and a pixel image signal $V_{signal}$, which is read out of the diffusion region after photo-generated charges are transferred from the photosensor to the floating diffusion region due to the impinging light on the photosensor. The final value assigned to a pixel is the difference between $V_{reset}$ and $V_{signal}$. Such technique is known as correlated double sampling (CDS) and yields good representation of the true charge associated with each pixel. A pixel sampling circuit 130 samples the $V_{reset}$ and the $V_{signal}$ signals and provides the signals to an amplifier, such as a programmable gain amplifier (PGA) 134. The signals are typically subtracted by the amplifier 134 to generate an output signal $V_{out}$. The control block 120 may additionally provide a gain control signal GAIN to the amplifier 134 to amplify the received $V_{out}$ signal as needed. The difference between the two signals ($V_{reset}-V_{signal}$) represents the amount of light impinging on the photosensor. The $V_{out}$ signal is converted to a digital signal by an analog-to-digital converter (ADC) 132 to produce a digital image signal IMAGE_OUT that may be electronically stored or further processed to create a digital image. The control block 120 also provides a clock signal CLK to the column decoder 124 and to a clock generator 136, which provides timing signals used to calculate the output signal $V_{out}$ and convert $V_{out}$ to the IMAGE_OUT signal.

Figures 2A, 2B:
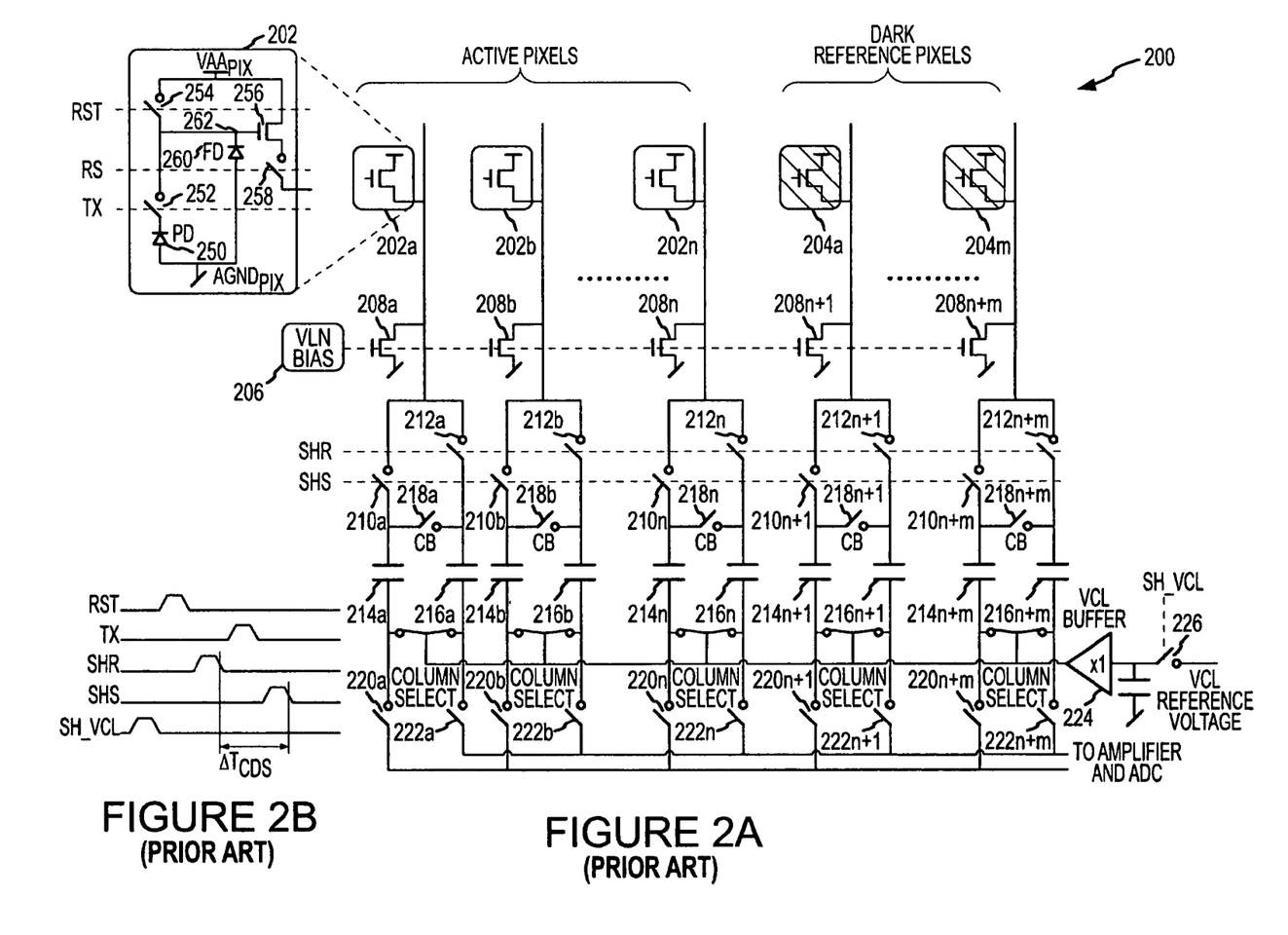
FIG. 2A is a schematic diagram of a prior art circuit for row-wise sampling that supports row-wise correction in the digital domain.
FIG. 2B is a timing diagram of row-wise sampling for the circuit of FIG. 2A.

FIG. 2A illustrates a schematic diagram of a prior art circuit 200 for row-wise sampling that supports the previously-described approach for suppressing row-wise noise in the digital domain. The active pixels 202a-202n and the dark reference pixels 204a-204m include the same components as illustrated in pixel 202. Each of the pixels includes a photosensor 250, a floating diffusion (FD) diode 262, a FD node 260, and four devices 252-258, such as transistors, that can be enabled and disabled with a voltage applied to a controlling electrode of the device. The photosensor 250 may be a photodiode, photogate, photoconductor, or any other light-sensing photo detector as known in the art, although it is shown as a photodiode in the figures for illustration purposes. The photosensor 250 is coupled to the transfer transistor 252 that is enabled by the transfer (TX) signal to allow a transfer of charge to the FD node 262 as light impinging on the photosensor 250 is converted to an electric charge. The reset transistor 254 is connected to the FD node 262 so that during the reset stage the FD node 262 may be recharged to a supply voltage $VAA_{PIX}$ when the reset transistor 254 is enabled by the RST signal. The FD node 262 is additionally connected to the gate of a source follower transistor 256 such that the charge at the FD node 262 controls the conductivity of the source follower transistor 256. The output of the source follower transistor 256 is provided to a load transistor (not shown) through a row select transistor 258 that is enabled by the row select signal RS.

A column sampling circuit is attached to each of the active pixels 202a-n and dark reference pixels 204a-m. As shown in FIG. 2A, for each pixel the column sampling circuit includes a VLN bias module 206, a per-column transistor 208a-n+m, a pair of column sampling capacitors 214a-n+m, 216a-n+m, and $V_{CL}$ buffer 224. The VLN bias module 206 provides a bias voltage to the gate of the per-column transistor 208a-n+m that serves as current bias source for the pixel source follower transistor 256. The $V_{CL}$ buffer 224 drives the back plate of all the column sampling capacitors 214a-n+m, 216a-n+m upon pixel sampling. The column sampling circuit further includes transistors 210a-n+m, 212a-n+m, 218a-n+m, 220a-n+m, and 222a-n+m to facilitate correlated double sampling.

Several sources of row-wise noise can be identified in the circuit of FIG. 2A. For instance, there is power supply noise ($VAA_{PIX}/AGND_{PIX}$), which will couple capacitively onto the floating diffusion (FD) node 262, which has high impedance when reset (RST) 254 is disabled. There is also noise from the module VLN bias 206, which will modulate the output voltage from the pixel source follower transistor 252 as well as the voltage in node $VAA_{PIX}$, assuming finite $VAA_{PIX}$ source resistance. Additionally, there is noise from the $V_{CL}$ buffer 224. Note that the input voltage reference for the $V_{CL}$ buffer 224 is sampled before the pixels are sampled so that the sampled reference noise is completely removed through CDS. Notably, the noise from the sources discussed above will be shaped through CDS which means that noise spectral components at low frequency ($f \ll 1/\Delta T_{CDS}$) are suppressed whereas noise spectral components at higher frequencies are not prevented from passing through.

FIG. 2B illustrates the operation of the circuit 200 as shown in timing diagram of various timing signals provided by a control circuit, such as the control block 120 of FIG. 1. Typically, operation of each pixel involves a reset stage and a signal sampling stage. A signal SH_VCL is first applied to enable transistor 226 to couple the $V_{CL}$ reference voltage to the input of $V_{CL}$ buffer 224, to provide voltage for the $V_{CL}$ buffer 224 to drive the back plates of the pixels 202a-n, 204a-m. With a row select signal (RS) enabling the selected row of pixels, a reset signal (RST) is applied to enable transistor 254 in the pixels 202a-n, 204a-m during the reset stage to charge the FD node 262 to a high voltage such as $VAA_{PIX}$.

Next, a sample-hold-reset signal (SHR) is applied to enable transistor 212a-n+m during the signal sampling stage to allow sampling of the pixel reset level, as reference, from each pixel 202a-n, 204a-m at column sampling capacitor 216a-n+m. During pixel reset level sampling, the back plates of the column sampling capacitors 214a-n+m, 216a-n+m are biased by the $V_{CL}$ buffer 224 through the transistor switches (not labeled) between the $V_{CL}$ buffer 224 and the column sampling capacitors 214a-n+m, 216a-n+m, whereas the column select transistors 220a-n+m, 222a-n+m are not asserted (open). Sampling of the pixel reset level then occurs at the falling edge of the SHR pulse signal with all pixels on the same row are sampled in parallel.

Subsequently, the transistor 252 in the pixels 202a-n, 204a-m is enabled by the TX signal to allow charge from photosensor 250 to be transferred to FD node 262 for signal readout. Then, a sample-hold-sample signal (SHS) is applied to enable transistor 210a-n+m to allow sampling of the pixel signal level from the pixel 202a-n, 204a-m at column sampling capacitor 214a-n+m. During pixel signal level sampling, the back plates of the column sampling capacitors 214a-n+m, 216a-n+m are biased by the $V_{CL}$ buffer 224 through the transistor switches (not labeled) between the $V_{CL}$ buffer 224 and the column sampling capacitors 214a-n+m, 216a-n+m, whereas the column select transistors 220a-n+m, 222a-n+m are not asserted (open). Sampling of the pixel signal level then occurs at the falling edge of the SHS pulse signal with all pixels on the same row are sampled in parallel. The time between the falling edges of SHR and SHS signals, $\Delta T_{CDS}$, is the correlated double sampling time.

The sampling operation just described with respect to the active pixels 202a-n is the same for the dark reference pixels 204a-m. When both pixel reset level and pixel signal level have been sampled onto the column sampling capacitors 214a-n+m, 216a-n+m, charge from the column sampling capacitors 214a-n+m, 216a-n+m can be read (in a differential manner) by asserting the column select transistors and asserting the CB switch 218a-n+m so that the charge is transferred to the readout amplifier (charge-to-voltage amplifier). The column select transistors 220a-n+m, 222a-n+m are asserted for one set of column sampling capacitors 214a-n+m, 216a-n+m (reset/signal) at a given time (serial scan).

In general, referring to FIG. 2A, the operation involves sampling analog signals from the active pixels 202a-n and the dark reference pixels 204a-m followed by amplification of the sampled analog signals. Then, the amplified analog signals are converted into corresponding digital signals by an ADC. Lastly, noise suppression is performed using the digital signals. Specifically, the estimated correlated noise derived from sampling of the dark reference pixels 204a-m is not subtracted from the signals of active pixels 202a-n from the same row until after the analog signals from dark reference pixels 204a-m and active pixels 202a-n have been sampled, amplified, and converted into digital signals. Therefore, correction for noise is done in the digital domain.

Figures 3A, 3B:
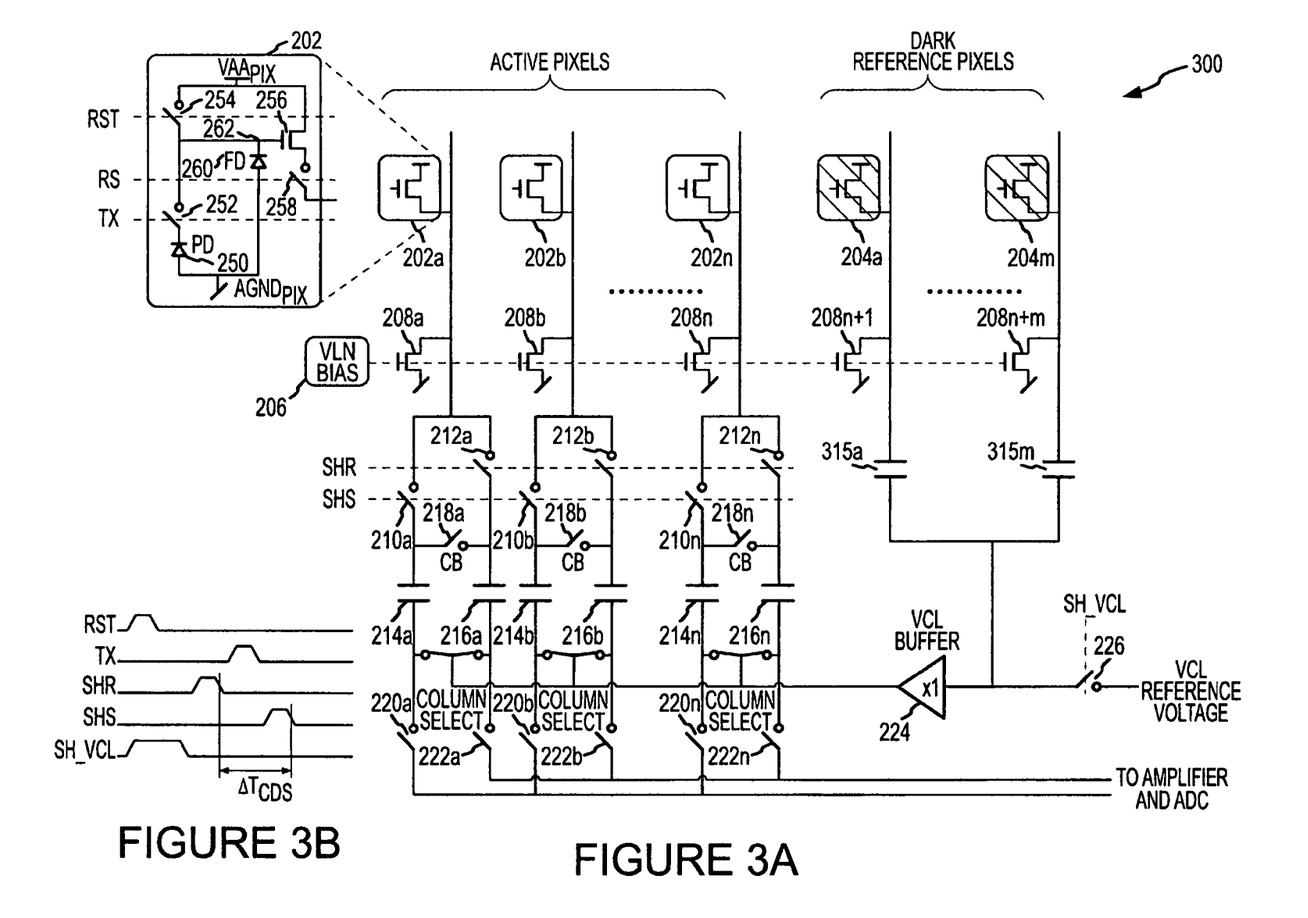
FIG. 3A is a schematic diagram of a circuit for suppression of row-wise noise in the analog domain according to one embodiment of the invention.
FIG. 3B is a timing diagram of row-wise sampling for the circuit of FIG. 3A.

FIG. 3A illustrates a schematic diagram of a circuit 300 for suppression of row-wise noise in the analog domain according to one embodiment of the invention. Much of the components shown in FIG. 3A have been previously described with respect to FIG. 2A, and are identified in FIG. 3A by the same reference numerals. Therefore, in the interest of brevity, an explanation of the structure and operation of these same components will not be repeated. In circuit 300, each of the dark reference pixels 204a-m is coupled to the input of the $V_{CL}$ buffer 224 via a capacitor 315a-m. Given that the effective capacitance of the parallel-coupled capacitors 315a-m is the sum of capacitances of the capacitors 315a-m, the result of having dark reference pixels 204a-m coupled to the input of the $V_{CL}$ buffer 224 through parallel-coupled capacitors 315a-m is that the averaged output from dark reference pixels 204a-m is applied to the input of the $V_{CL}$ buffer 224. The output from the $V_{CL}$ buffer 224 is used to bias the back plate of column sampling capacitors 214a-n, 216a-n during sampling of the reset and signal levels from active pixels 202a-n. Since the $V_{CL}$ buffer 224 tracks the average value from the dark reference pixels 204a-m, this configuration is equivalent to analog subtraction of the average value of the dark reference pixels 204a-m from the active pixels 202a-n on the same row.

The dark reference pixels 204a-m are utilized to sense noises similar to the noises the active pixels are exposed to and to provide a corresponding reference signal, such as a voltage level, to be used to cancel out some portion of the noise in the signals from the active pixels. Therefore, although dark reference pixels are illustrated and described herein for the various embodiments of the invention, any device that can perform the functions just described can be used as an alternative to dark reference pixels.

FIG. 3B illustrates the operation of the circuit 300 as shown in timing diagram of various timing signals provided by a control circuit, such as the control block 120 of FIG. 1. The reset signal RST enables transistor 254 in pixels 202a-n, 204a-m to reset the pixel FD node 262. The SH_VCL signal enables transistor 226 to allow sampling of the input of the $V_{CL}$ buffer 224 on a set of capacitors (not shown) relative to the averaged output from the dark reference pixels 204a-m on the falling edge of the SH_VCL signal. Next comes the correlated double sampling of the active pixels 202a-n, same as it is done with circuit 200. In short, this includes sampling of pixel reset levels on the falling edge of the SHR signal, transferring of charge from PD 250 to FD node 262 on the falling edge of the TX signal, and sampling pixel signal levels on the falling edge of the SHS signal.

Overall, the operation of the pixel sampling circuit 300 in FIG. 3A involves sampling analog signals from the dark reference pixels 204a-m and applying those signals for noise suppression as analog signals from the active pixels 202a-n are sampled. Since the analog signals from the active pixels 202a-n are corrected for noise before the signals are amplified and converted into digital signals, noise suppression is done in the analog domain.

One key advantage associated with a scheme such as that of circuit 300 is that the sampling time for a row is independent of the number of dark reference pixels used for row-wise correction, since the suppression of row-wise noise is applied during pixel sampling. Furthermore, another key advantage is that, since the correction is done before analog gain, the dark reference pixels can be used independent on color plane, assuming pixels from different color planes match electrically. On the contrary, with such scheme, noise from the $V_{CL}$ buffer is still not cancelled and there is no mechanism to filter or discard output values from any defective dark reference pixels.

To improve the accuracy in the correction for noise, several requirements should be adhered to. For instance, the total sum of the capacitance between dark reference pixels 204a-m and the input of the $V_{CL}$ buffer 224 should be large compared to the input capacitance of the $V_{CL}$ buffer 224. Moreover, the bandwidth of the $V_{CL}$ buffer 224 should be sufficiently high to obtain good matching of the bandwidth from the active pixels 202a-n and the dark reference pixels 204a-m to the terminals of the column sampling capacitors 214a-n, 216a-n. Further, since noise from the $V_{CL}$ buffer 224 will be translated to row-wise noise in the recreated image, it is important that the $V_{CL}$ buffer amplifier 224 has low noise and high power supply rejection ratio (PSRR) within the bandwidth of the column sampling network.

Figures 4A, 4B:
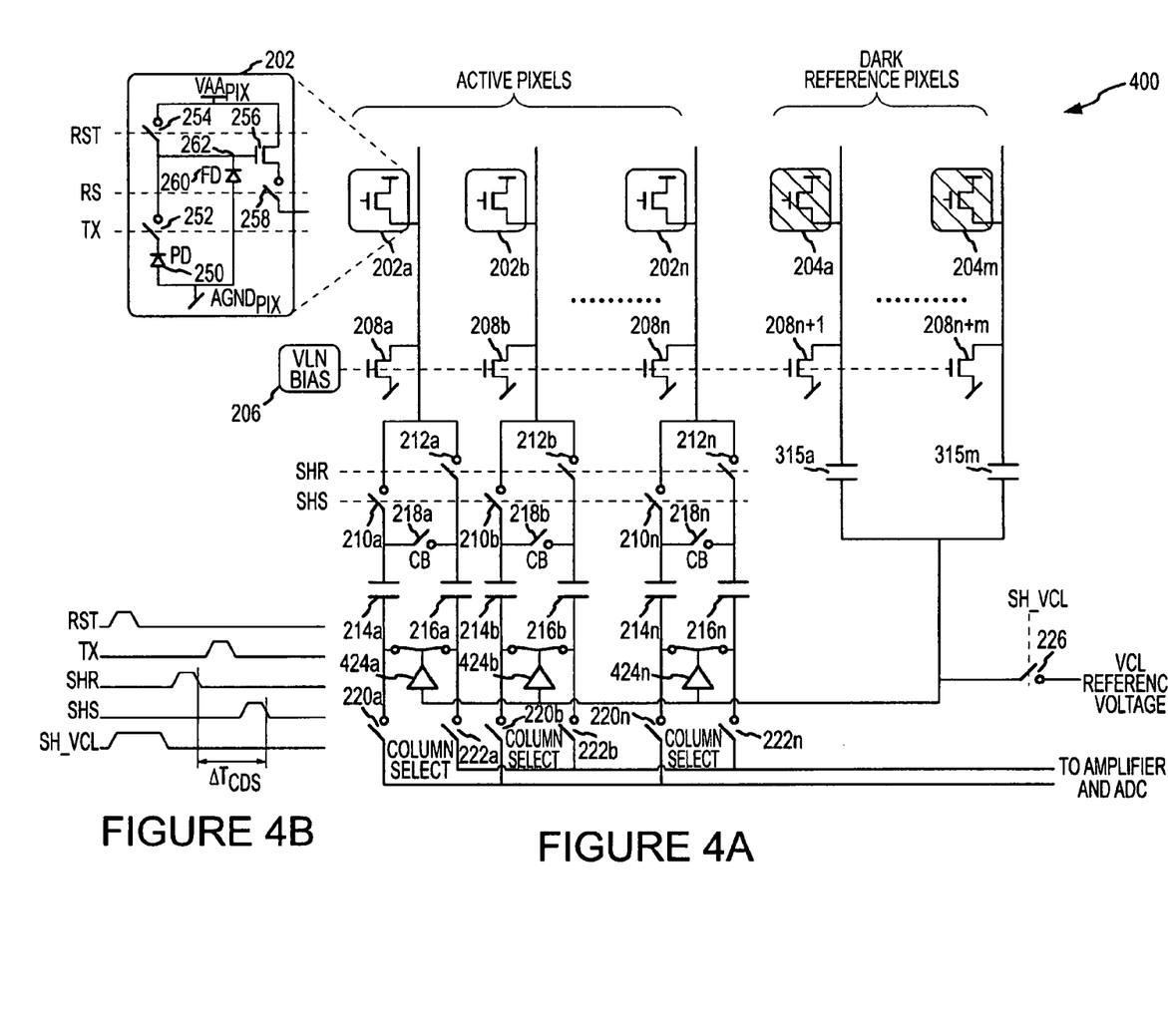
FIG. 4A is a schematic diagram of a circuit for suppression of row-wise noise in the analog domain according to another embodiment of the invention.
FIG. 4B is a timing diagram of row-wise sampling for the circuit of FIG. 4A.

FIG. 4A illustrates a schematic diagram of a circuit 400 for suppression of row-wise noise in the analog domain according to another embodiment of the invention. Much of the components shown in FIG. 4A have been previously described with respect to FIGS. 2A and 3A, and are identified in FIG. 4A by the same reference numerals. In circuit 400, the dark reference pixels 204a-m are coupled to each of the per-column $V_{CL}$ buffers 424a-n through the capacitors 315a-m. Unlike the configuration in circuit 300, where the averaged output from dark reference pixels 204a-m is applied to a single $V_{CL}$ buffer 224 that drives all the column sampling capacitors 214a-n, 216a-n, in circuit 400 the averaged output from dark reference pixels 204a-m is applied to the input of each per-column $V_{CL}$ buffer 424a-n, which drives the back plate of the column sampling capacitors 214a-n, 216a-n of the respective column. As with circuit 300, here the output from the $V_{CL}$ buffer 424a-n is used to bias the back plate of column sampling capacitors 214a-n, 216a-n during sampling of the reset and signal levels from active pixels 202a-n. Since the $V_{CL}$ buffer 424a-n tracks the average value from the dark reference pixels 204a-m, this configuration is equivalent to analog subtraction of the average value of the dark reference pixels 204a-m from the active pixels 202a-n on the same row.

FIG. 4B illustrates the operation of the circuit 400 as shown in timing diagram of various timing signals provided by a control circuit, such as the control block 120 of FIG. 1. Much of the operation of FIG. 4A has been previously described with respect to FIG. 3A with the only difference being the replacement of $V_{CL}$ buffer 224 with $V_{CL}$ buffers 424a-n in FIG. 4A. In the interest of brevity, an explanation of the operation of FIG. 4A and timing diagram of FIG. 4B will not be repeated. As with the noise-suppression scheme in FIG. 3A, here the noise suppression is done in the analog domain.

The pixel sampling circuit in FIG. 4A also has the same key advantages and disadvantages as those of the pixel sampling circuit in FIG. 3A. Additionally, with the single $V_{CL}$ buffer 224 replaced by per-column $V_{CL}$ buffers 424a-n, circuit 400 further has the advantage that thermal and flicker noise from the individual $V_{CL}$ buffer amplifiers 424a-n is converted to pixel-wise noise instead of row-wise noise. This helps further reduce row-wise noise, however, with the tradeoff of an increase in pixel-wise noise.

Some requirements should be adhered to for improving the accuracy in the correction for noise in FIG. 4A. First, the total sum of the capacitance between the dark reference pixels 204a-m and the input of the $V_{CL}$ buffers 424a-n should be large compared to the total input capacitance of the $V_{CL}$ buffers 424a-n. The bandwidth of the $V_{CL}$ buffers 424a-n should be sufficiently high to obtain good matching of the bandwidth from the active pixels 202a-n and the dark reference pixels 204a-m to the terminals of the column sampling capacitors 214a-n, 216a-n. Lastly, the $V_{CL}$ buffers 424a-n should have high PSRR within the bandwidth of the column sampling network, since power supply noise coupled to the output of the $V_{CL}$ buffers 424a-n will appear as row-wise noise in the recreated image.

Figures 5A, 5B:
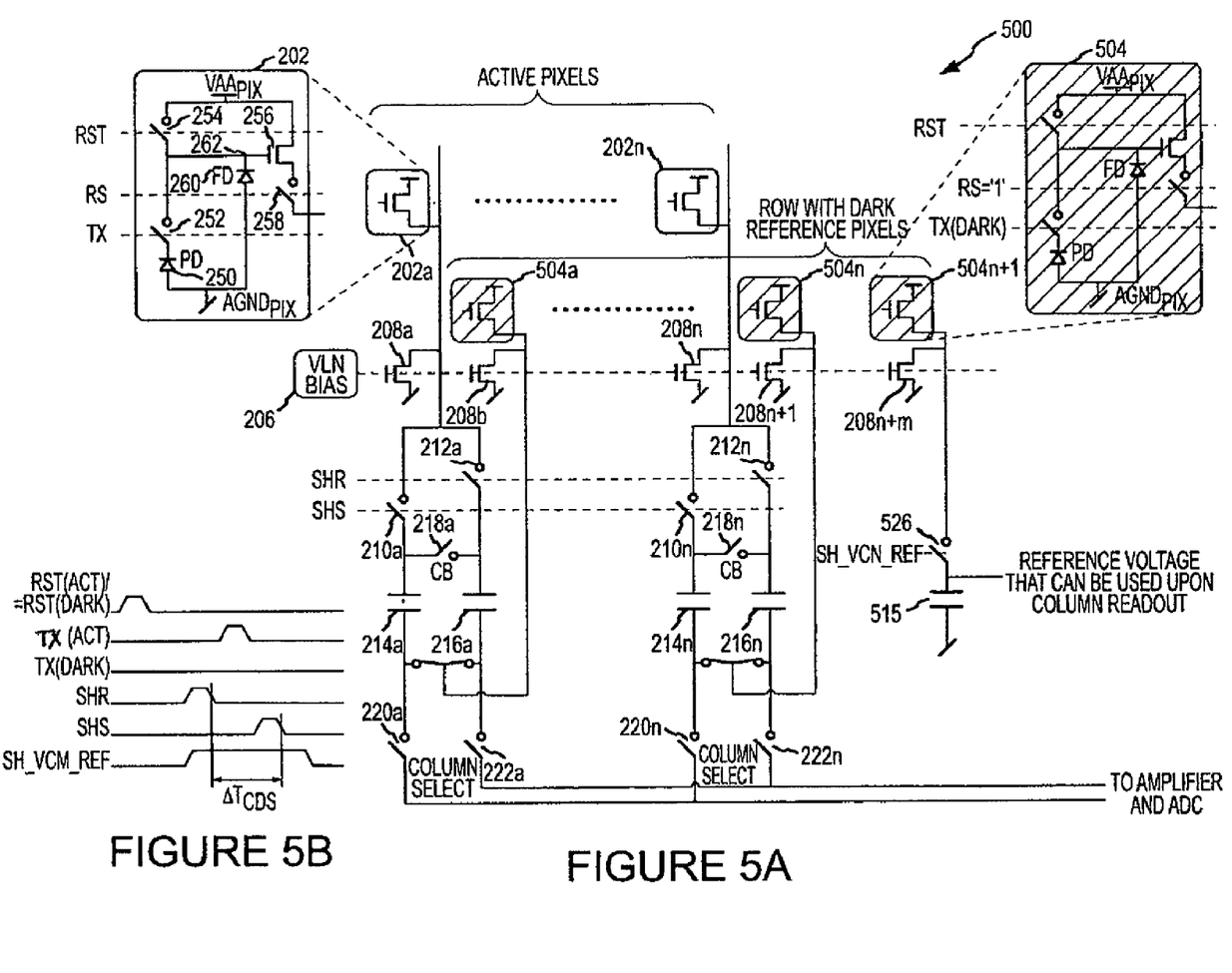
FIG. 5A is a schematic diagram of a circuit for suppression of row-wise noise in the analog domain according to an alternative embodiment of the invention.
FIG. 5B is a timing diagram for the circuit of FIG. 5A.

FIG. 5A illustrates a schematic diagram of a circuit 500 for suppression of row-wise noise in the analog domain according to an alternative embodiment of the invention. Much of the components shown in FIG. 5A have been previously described with respect to FIGS. 2A, 3A, and 4A, and are identified in FIG. 5A by the same reference numerals. In FIG. 5A, each of the dark reference pixels 504a-n is coupled to the column sampling capacitors 214a-n, 216a-n of a respective column for a respective active pixel 202a-n. As a result, the back plates of the column sampling capacitors 214a-n, 216a-n are biased directly by signals from the dark reference pixels 504a-n. This configuration allows each individual active pixels in a row of active pixels 202a-n to be corrected for noise using a respective dark reference pixel of a row of dark reference pixels 504a-n. In other words, a single row of dark reference pixels 504a-n is used for per-column biasing of the column sampling capacitors 214a-n, 216a-n. When the dark reference pixels 504a-n match the active pixels 202a-n electrically, this scheme will provide suppression of row-wise noise through analog subtraction.

In FIG. 5A, an additional dark reference pixel $504_{n+1}$ of the row of dark reference pixels is coupled to a capacitor 515 via transistor 526, which can be enabled by the SH_VCM_REF signal for sampling voltage level from the dark reference pixel $504_{n+1}$. Sampling the output voltage level from the dark reference pixel $504_{+1}$, on a separate capacitor 515 provides a reference voltage that can be used for resetting the column output lines during readout. In particular, reset is applied whenever a new channel is accessed through the column select transistors 220a-n, 222a-n. Moreover, the row select signal RS to each of the dark reference pixels 504a-n, $504_{+1}$ is set to be on (e.g. a "1" or high voltage signal) at all times, so that the output voltage levels of the dark reference pixels 504a-n, $504_{n+1}$ can be constantly applied to the back plate of and drive column sampling capacitors 214a-n, 216a-n.

FIG. 5B illustrates the operation of the circuit 500 as shown in timing diagram of various timing signals provided by a control circuit, such as the control block 120 of FIG. 1. The reset signal RST enables transistor 254 in active pixels 202a-n and dark reference pixels 504a-n to reset the pixel FD node 262. The CDS process of active pixel output begins with sampling of reset level of active pixels 202a-n on capacitors 216a-n at the falling edge of the SHR signal. Then, in the active pixels 202a-n but not in the dark reference pixels 504a-n, charge from PD 250 is transferred to the FD node 262 as transistor 252 is enabled by the TX(act) signal. There is no TX signal applied to the dark reference pixels 504a-n, as represented by a flat signal line TX(dark) with no pulse, since the dark reference pixels 504a-n in this configuration will have different integration time compared to that of the active pixels 202a-n. Particularly, the row of dark reference pixels 504a-n has a fixed integration time that is equal to one row-time, the time for sampling a row of active pixels. After the charge transfer, the CDS process concludes with sampling of signal level of active pixels 202a-n on capacitors 214a-n at the falling edge of the SHS signal. Furthermore, the SH_VCM_REF signal enables transistor 526 for sampling voltage level from the dark reference pixel $504_{n+1}$ on capacitor 515 to provide a reference voltage as previously discussed.

Overall, the operation of the pixel sampling circuit 500 in FIG. 5A involves applying the analog signals from the dark reference pixels 504a-n for noise suppression when sampling analog signals from the active pixels 202a-n. Since the analog signals from the active pixels 202a-n are corrected for noise before the signals are amplified and converted into digital signals, noise suppression is done in the analog domain.

The pixel sampling circuit in FIG. 5A has a key advantage that row-wise noise suppression does not impact the row-time since it is done during pixel sampling. Further, different from the pixel sampling and noise correction schemes in FIGS. 3A and 4A, a source of row-wise noise, the $V_{CL}$ buffer amplifier, has been eliminated in FIG. 5A. In terms of tradeoffs associated with using a scheme as that in FIG. 5A, reduction of row-wise noise comes at the cost of higher pixel-wise noise. Moreover, there is no mechanism to filter or discard output values from any defective dark reference pixels.

To improve accuracy in the correction for noise, the output from the dark reference pixels 504a-n should match the output from the active pixels 202a-n for signal frequencies within the bandwidth of the column sampling network. Further, in order to meet this requirement it might be required to add extra load capacitance on the output of the dark reference pixels 504a-n.

Figure 6:
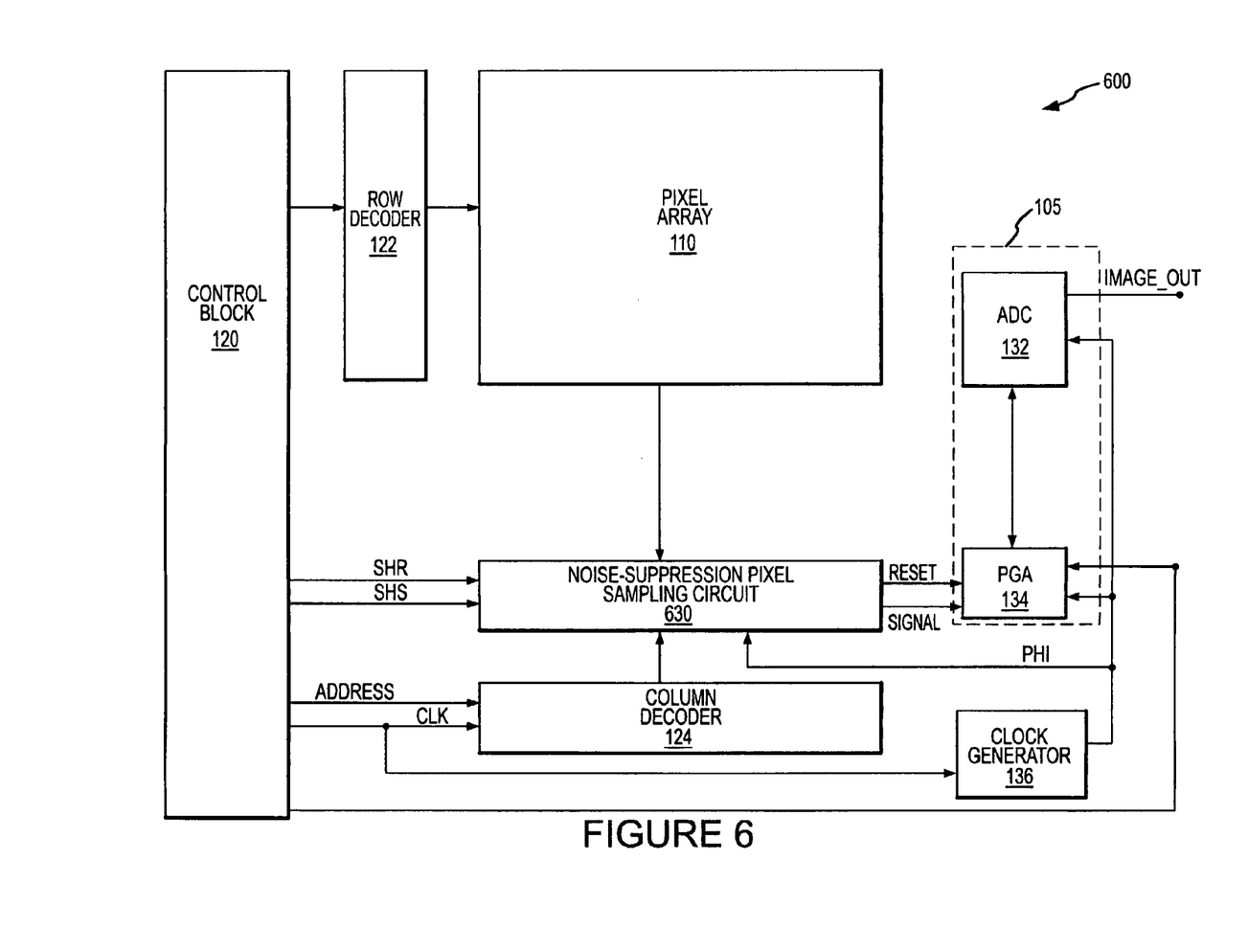
FIG. 6 is a block diagram of a CMOS image sensing device according to an embodiment of the invention.

FIG. 6 is a block diagram of a CMOS image sensing device 600 according to an embodiment of the invention. Much of the components shown in FIG. 6 have been previously described with respect to FIG. 1, and are identified in FIG. 6 by the same reference numerals. Therefore, in the interest of brevity, an explanation of the structure and operation of these same components will not be repeated. The image sensing device 600 includes a noise-suppression pixel sampling circuit 630 that supports suppression of row-wise noise in the analog domain. In one embodiment, the noise-suppression pixel sampling circuit 630 incorporates the scheme of FIG. 3A. In another embodiment, the noise-suppression pixel sampling circuit 630 incorporates the scheme of FIG. 4A. In yet another embodiment, the noise-suppression pixel sampling circuit 630 incorporates the scheme of FIG. 5A. Alternatively, the noise-suppression pixel sampling circuit 630 includes circuitry that supports row-wise noise suppression in the analog domain within the spirit of those in FIGS. 3A, 4A, and 5A.

Figure 7:
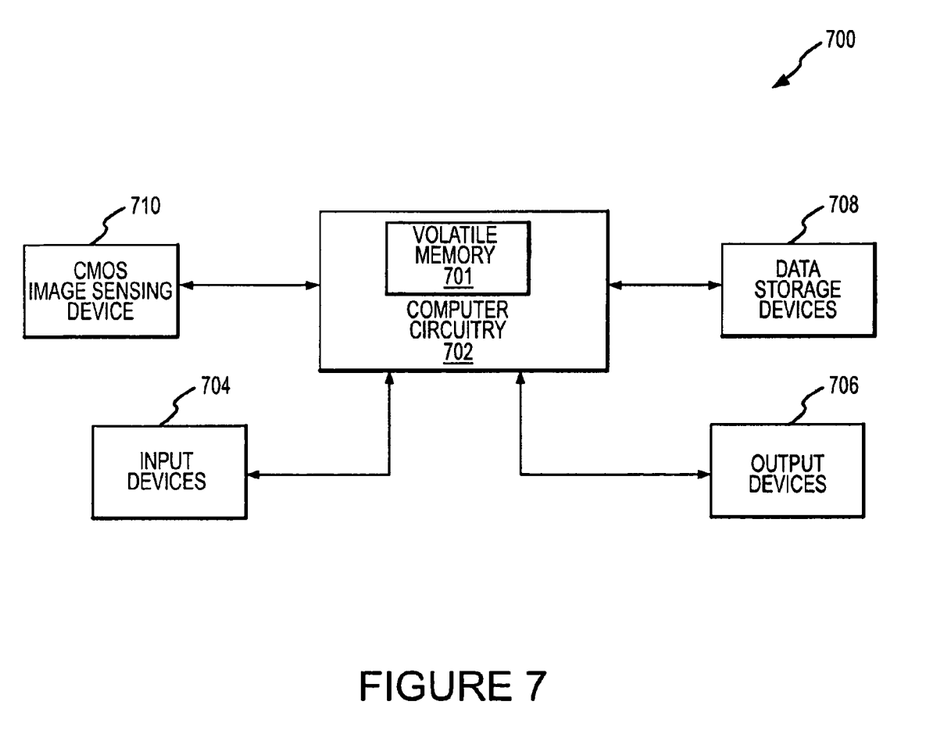
FIG. 7 is a simplified block diagram of a processor-based system according to an embodiment of the invention.

FIG. 7 is a block diagram of an embodiment of a computer system 700 that includes a CMOS image sensing device 710. The CMOS image sensing device 710 includes the noise-suppression pixel sampling circuit 630 of FIG. 6 in accordance with embodiments of the invention. Such a system may be included in a camera system, laptop, scanner, video system, and others systems having the CMOS image sensing device 710. Conventionally, the computer circuitry 702 is coupled through address, data, and control buses to a volatile memory device 701 to provide for writing data to and reading data from the volatile memory device 701. The computer circuitry 702 includes circuitry for performing various processing functions, such as executing specific software to perform specific calculations or tasks. In addition, the computer system 700 may include one or more input devices 704, such as a keyboard or a mouse, coupled to the computer circuitry 702 to allow an operator to interface with the computer system 700. Typically, the computer system 700 may also include one or more output devices 706 coupled to the computer circuitry 702, such as output devices typically including a printer and a video terminal. One or more data storage devices 708 are also typically coupled to the computer circuitry 702 to store data or retrieve data from external storage media (not shown). Examples of typical storage devices 708 include hard and floppy disks, tape cassettes, compact disk read-only ("CD-ROMs") and compact disk read-write ("CD-RW") memories, and digital video disks ("DVDs"). Data storage devices 708 may also include devices to store data that is to be retained even when power is not supplied to the computer system 700 or the data storage devices 708, such as a flash memory device (not shown) according to some other examples of the invention.

Figure 8:
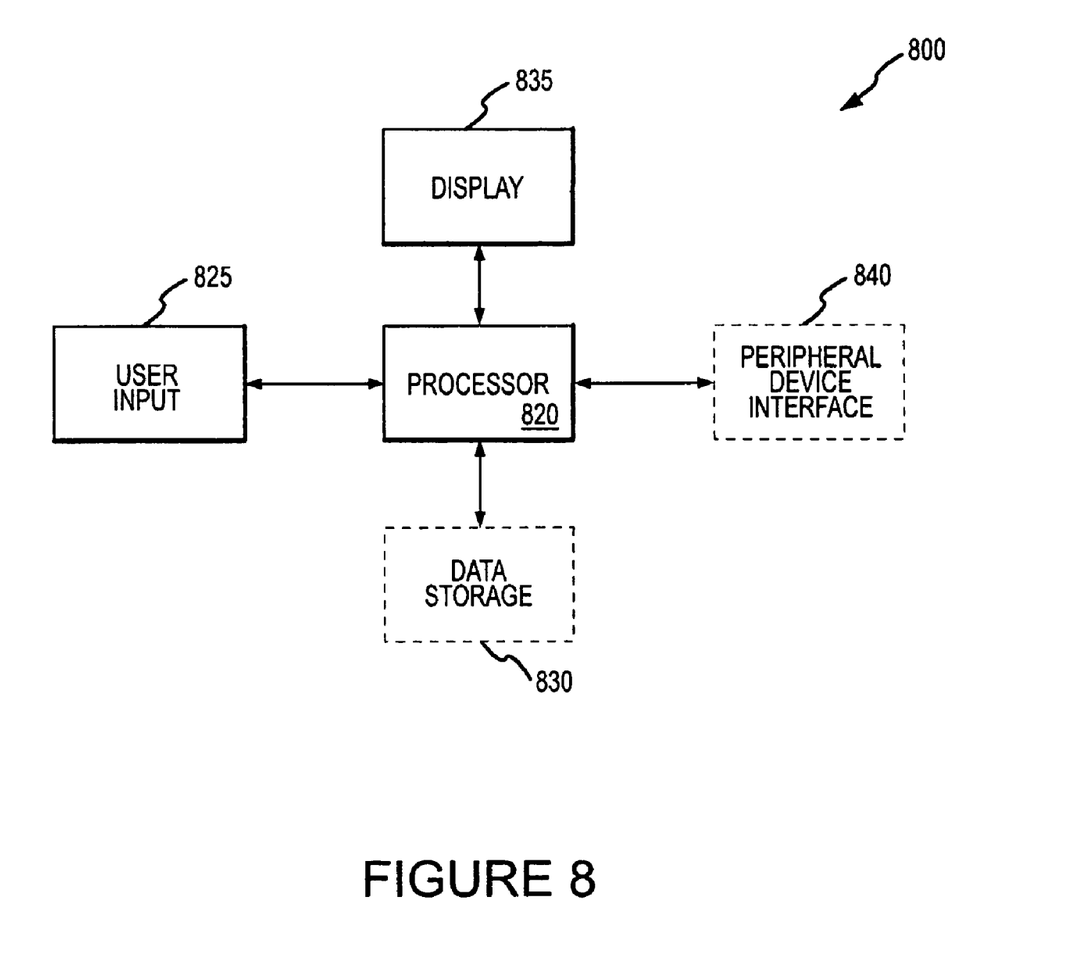
FIG. 8 is a block diagram of an electronic device according to an embodiment of the invention.

FIG. 8 is a block diagram of an embodiment of a consumer device 800 having a processor 820 and a user input 825 that includes the CMOS image sensing device 600 of FIG. 6 according to embodiments of the invention. The consumer device 800 may be a digital camera, a vehicle navigation system, videophone, cell phone, audio player with imaging capabilities, or other small devices and portable devices that utilize CMOS image sensing technology. The processor 820 may be a microprocessor, digital signal processor, or part of a central processing unit that communicates with the user input 825 over a bus. The processor may 820 additionally have a random access memory (RAM) or, alternatively, the user input 825 may include the RAM to which the processor communicates over the bus. The CMOS image sensing device 600 may be combined with the processor 820 with or without memory storage on a single integrated circuit or on a different chip than the processor 820. The consumer device 800 includes a display 835, such as a cathode ray tube (CRT) or liquid crystal display (LCD), for displaying information captured by the image sensing device 600. The consumer device 800 may also include a storage device 830, such as removable Flash memory, capable of storing data processed by processor 820, including, for example, digital image data. The consumer device 800 may optionally have a peripheral device interface 840 so that the processor 820 may communicate with a peripheral device (not shown). A number of peripheral devices may be connected to the consumer device 800, such as a camera lens, an audio recorder or a microphone, or a battery pack.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A pixel sampling circuit, comprising:
   a readout circuit coupled to a plurality of pixels arranged in rows to receive analog pixel signals from each row of pixels of the plurality of pixels; and
   a noise correction circuit coupled to the readout circuit operable to sense noise, the noise correction circuit comprising:
   a plurality of dark reference pixels arranged in rows, each dark reference pixel of a row of dark reference pixels of the plurality of dark reference pixels being coupled to a respective pixel of a row of pixels of the plurality of pixels, wherein each dark reference pixel is operative to provide at least one reference signal that corresponds to the noise sensed for each respective pixel of the row of pixels to remove at least a portion of a noise component of the pixel signals received from the row of pixels while the pixel signals are analog signals; and
   a reference unit comprising a separate dark reference pixel, a transistor, and a capacitor, the separate dark reference pixel not being coupled to the plurality of pixels, and wherein a signal of the separate dark reference pixel is sampled on the capacitor to provide a separate reference signal that is operable to reset an output line of the readout circuit.

2. The pixel sampling circuit of claim 1 wherein the noise correction circuit is operable to generate a plurality of reference signals responsive to noise sensed by the noise correction circuit, each of the plurality of reference signals provided to the readout circuit for a respective pixel of the plurality of pixels.

3. A pixel sampling circuit, comprising:
   a readout circuit having a plurality of sampling units arranged in rows, each sampling unit coupled to a respective pixel of a row of pixels to receive analog pixel signals from the respective pixel;
   at least one reference unit coupled to the readout circuit, the at least one reference unit operable to sense noise and comprising a row of dark reference pixels, each dark reference pixel of the row of dark reference pixels being coupled to a respective pixel of the row of pixels, wherein each dark reference pixel is operative to provide a reference signal that corresponds to the sensed noise for each respective pixel of the row of pixels to cancel at least a portion of a noise component of the pixel signals received from the row of pixels while the pixel signals are analog signals; and
   a separate reference unit coupled to the readout circuit, the separate reference unit comprising a separate dark reference pixel, a transistor, and a capacitor, the separate dark reference pixel not being coupled to the row of pixels, and wherein a signal of the separate dark reference pixel is sampled on the capacitor to provide a separate reference signal that is operable to reset an output line of the readout circuit.

4. The pixel sampling circuit of claim 3 wherein the at least one reference unit comprises a plurality of reference units each of which is coupled to and provides a respective reference signal to and drives a respective sampling unit of the plurality of sampling units.

5. An image sensing circuit, comprising:
an array of light-sensing pixels arranged in rows, each of the light-sensing pixels operable to provide a first signal and a second signal;
a pixel sampling circuit coupled to the array and operable to receive the first and second signals from the array of light-sensing pixels and operable to output corresponding noise-suppressed first and second signals, the pixel sampling circuit comprising:
  a plurality of sampling units arranged in rows, each sampling unit of each row of sampling units coupled to a respective light-sensing pixel of a respective row of the array of light-sensing pixels and operable to receive the respective first and second signals from the respective pixel;
  a plurality of reference units coupled to the plurality of sampling units, the plurality of reference units operable to sense noise and comprising an array of dark reference pixels arranged in rows, each dark reference pixel of each row of the array of dark reference pixels being coupled to a respective light-sensing pixel of a respective row of the array of light-sensing pixels, wherein each dark reference pixel is operative to provide a reference signal corresponding to the sensed noise to the plurality of sampling units to cancel at least a portion of a noise component of the received first and second signals while the first and second signals are analog signals; and
  a separate reference unit comprising a separate dark reference pixel, a transistor, and a capacitor, the separate dark reference pixel not being coupled to the array of light-sensing pixels, and wherein a signal of the separate dark reference pixel is sampled on the capacitor to provide a reference voltage that is operable to reset an output line;
an amplifier circuit coupled to receive the noise-suppressed first and second signals from the pixel sampling circuit, the amplifier circuit operable to generate a plurality of final output signals each of which for a respective light-sensing pixel of the array of light-sensing pixels by amplifying the difference of the respective noise-suppressed first signal and the respective noise-suppressed second signal of each respective light-sensing pixel; and
an analog-to-digital converter coupled to receive the plurality of final output signals from the amplifier circuit and operable to convert each of the plurality of final output signals into a respective digital image signal.

6. The image sensing circuit of claim 5 wherein at least one of each of the plurality of reference units is coupled to a respective sampling unit to provide a respective reference signal to the respective sampling unit.

7. A computer system, comprising:
a data input device;
a data output device;
a data storage device;
a computing circuitry coupled to the data input device, the data output device, and the data storage device, the computing circuitry operable to process data to and from the data input device, the data output device, and the data storage device; and
an image sensing device coupled to the computing circuitry and operable to provide image data representing an image sensed by the image sensing device, the image sensing device comprising:
  a plurality of light-sensing pixels arranged in rows and operable to produce pixel signals;
  a readout circuit comprising a plurality of readout units each of which is coupled to a respective light-sensing pixel of the plurality of light-sensing pixels to receive the pixel signals from the respective light-sensing pixel;
  a plurality of reference units coupled to the readout circuit, the plurality of reference units operable to sense noise and comprising a plurality of dark reference pixels arranged in rows, each dark reference pixel of each row of the plurality of dark reference pixels being coupled to a respective light-sensing pixel of a respective row of the plurality of light-sensing pixels, wherein each dark reference pixel is operative to provide to the readout circuit a respective reference signal that corresponds to noise sensed for each respective light-sensing pixel to remove at least a portion of a noise component of the pixel signals while the pixel signals are analog signals; and
  a separate reference unit coupled to the readout circuit, the separate reference unit comprising a separate dark reference pixel, a transistor, and a capacitor, the separate dark reference pixel not being coupled to the plurality of light-sensing pixels, wherein a signal of the separate dark reference pixel is sampled on the capacitor to provide a reference voltage that is operable to reset an output line of the readout circuit.

8. The computer system of claim 7 wherein at least one of each of the plurality of reference units being coupled to a respective readout unit is operable to provide the respective reference signal to the respective readout unit.

9. A consumer device, comprising:
a processor operable to process data, addresses, and commands;
a display device coupled to the processor; and
an input device coupled to the processor, the input device comprising an image sensing device that is operable to provide image data representing image sensed by the image sensing device, the image sensing device comprising:
  a plurality of light-sensing pixels arranged in rows and operable to produce pixel signals;
  a readout circuit comprising a plurality of readout units each of which is coupled to a respective light-sensing pixel of the plurality of light-sensing pixels to receive the pixel signals from the respective light-sensing pixel;
  a plurality of reference units coupled to the readout circuit, the plurality of reference units operable to sense noise and comprising a plurality of dark reference pixels arranged in rows, each dark reference pixel of a row of dark reference pixels of the plurality of dark reference pixels being coupled to a respective light-sensing pixel of a row of light-sensing pixels of the plurality of light-sensing pixels, wherein each dark reference pixel is operative to provide to the readout circuit a respective reference signal that corresponds to noise sensed to remove at least a portion of a noise component of the pixel signals while the pixel signals are analog signals; and a separate reference unit coupled to the readout circuit, the separate reference unit comprising a separate dark reference pixel, a transistor, and a capacitor, the separate dark reference pixel not being coupled to the plurality of light-sensing pixels, wherein a signal of the separate dark reference pixel is sampled on the capacitor to provide a reference voltage that is operable to reset an output line of the readout circuit.

10. The consumer device of claim 9 wherein at least one of each of the plurality of reference units being coupled to a respective readout unit is operable to provide the respective reference signal to the respective readout unit.

11. The consumer device of claim 9, further comprising a data storage device for storing data from the processor and the input device.

12. The consumer device of claim 9, further comprising a peripheral device interface for coupling external devices to the processor.

13. A method for sampling pixel signals, comprising:
receiving pixel signals from at least one pixel of a row of pixels;
providing at least one reference signal that corresponds to at least a portion of noise to which each pixel of the row of pixels are susceptible using a row of dark reference pixels, wherein each dark reference pixel of the row of dark reference pixels is coupled to a respective pixel of the row of pixels;
sampling a signal of a separate dark reference pixel on a capacitor in order to provide a reference voltage that is operable to reset an output line of a readout circuit, wherein the separate dark reference pixel and the capacitor are coupled to a transistor to form a reference unit, the separate dark reference pixel not being coupled to the row of pixels; and compensating for noise in the received pixel signals with the at least one reference signal before the pixel signals are converted into digital signals.

14. The method of claim 13 wherein providing at least one reference signal that corresponds to at least a portion of noise to which each pixel of the row of pixels are susceptible comprises:
sensing the noise with a plurality of noise-sensing units, wherein each noise-sensing unit of the plurality of noise-sensing units comprises a respective dark reference pixel of the row of dark reference pixels; and
generating a plurality of noise reference signals each of which is generated by one of the plurality of noise-sensing units.

15. The method of claim 14 wherein compensating for noise in the received pixel signals with the at least one reference signal comprises subtracting a noise reference signal generated by a noise-sensing unit of the plurality of noise-sensing units from the pixel signals received from a respective pixel of the row of pixels to which the noise-sensing unit is coupled.

16. The pixel sampling circuit of claim 1 wherein the signal is an output voltage level of the separate dark reference pixel.

17. The pixel sampling circuit of claim 3 wherein the signal is an output voltage level of the separate dark reference pixel.

18. The image sensing circuit of claim 5 wherein the signal is an output voltage level of the separate dark reference pixel.

19. The computer system of claim 7 wherein the signal is an output voltage level of the separate dark reference pixel.

20. The consumer device of claim 9 wherein the signal is an output voltage level of the separate dark reference pixel.

21. The method of claim 13 wherein sampling the signal of the separate dark reference pixel further comprises sampling an output voltage level of the separate dark reference pixel on the capacitor.

* * * * *